United States Patent [19]

Funakoshi et al.

[11] Patent Number: 4,967,688
[45] Date of Patent: Nov. 6, 1990

[54] POWDER PROCESSING APPARATUS

[75] Inventors: Yoshiro Funakoshi, Kyoto; Takeshi Takashima, Osaka; Hiroshi Sakamoto, Osaka; Katsuhiro Inoue, Osaka; Yoshiyuki Asaba, Osaka; Kenichi Kasuya, Osaka, all of Japan

[73] Assignees: Fuji Sangyo Company, Limited, Osaka; Kyoto Institute of Powder Technology, Limited, Kyoto, both of Japan

[21] Appl. No.: 363,746

[22] Filed: Jun. 9, 1989

[51] Int. Cl.$^5$ .............................. B05C 9/00
[52] U.S. Cl. .................. 118/303; 34/57 D; 55/474
[58] Field of Search .......... 34/57 D; 427/213; 118/DIG. 5, 303; 261/93; 55/474

[56] References Cited

U.S. PATENT DOCUMENTS

| 2,085,947 | 7/1937 | Booth | 261/93 |
| 2,761,769 | 9/1956 | Elder | 34/57 D |
| 3,802,674 | 4/1974 | Hori | 261/93 |
| 4,323,312 | 4/1982 | Glatt et al. | 366/102 |
| 4,556,175 | 12/1985 | Motoyama et al. | 241/57 |

Primary Examiner—Bernard Nozick
Attorney, Agent, or Firm—Armstrong, Nikaido, Marmelstein, Kubovcik & Murray

[57] ABSTRACT

A powder processing apparatus of the fluidized bed type wherein air is blown into a cylindrical container through its bottom to perform various treatments while keeping powder in the container in fluidized condition. Air fed in through an opening in the bottom surface of the container is introduced into a rotating hollow frusto-conical body and is allowed to blow out in the centrifugal direction from an air diffusion clearance defined between the skirt end of the frusto-concial body and the bottom surface of the container, thereby forming a fluidized bed of powder. The portion of the bottom surface around the opening rises and/or a member made of air-permeable material is installed in the opening in the bottom surface to prevent passage of powder; this arrangement, coupled with the air current blowing out of the air diffusion clearance, prevents entry and hence flow-out of powder.

19 Claims, 7 Drawing Sheets

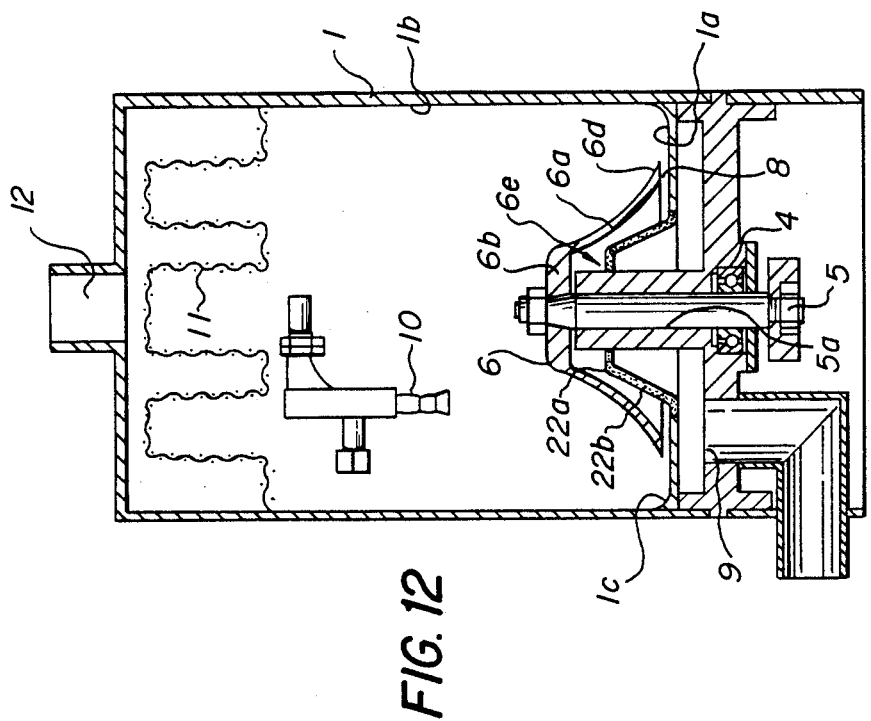
FIG. 12
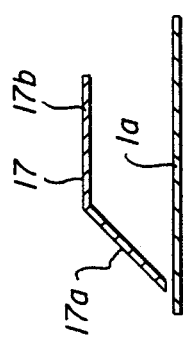
FIG. 6
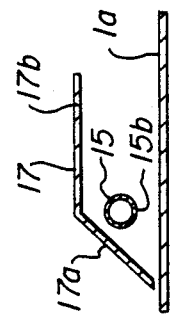
FIG. 7
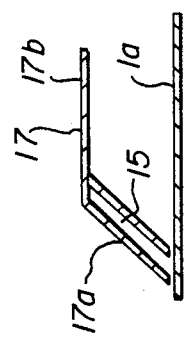
FIG. 8
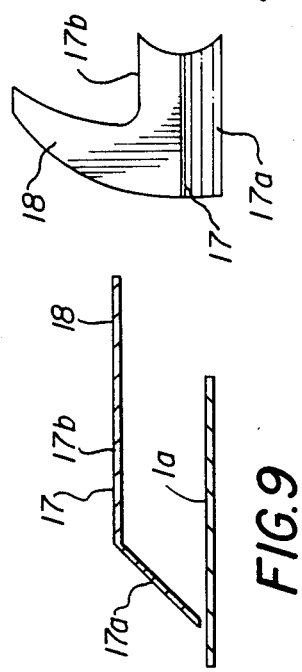
FIG. 10
FIG. 9

POWDER PROCESSING APPARATUS

FIELD OF THE INVENTION

The present invention relates to a powder processing apparatus for blowing air into a container through the bottom of the container to fluidize the powder in the container to thereby form a so-called fluidized bed, then performing such treatments as fluidized bed drying for drying the wet powder, fluidized bed granulation and agitated fluidized bed granulation by spraying the powder with a binder liquid to form granules or fluidized bed coating and agitated fluidized bed coating by spraying the particles with a coating liquid to form films thereon.

The apparatus according to the present invention is widely applicable for the processing of medicines, agricultural chemicals, foods, ceramics and other chemical products.

PRIOR ART

Heretofore, there have been extensively performed fluidized bed drying by blowing air into a container through the bottom of the container to keep the powder in a fluidized condition to thereby form a so-called fluidized bed and then drying the wet powder, fluidized bed granulation by spraying the powder with a binder liquid to form granules, and fluidized bed coating by spraying the particles with a coating liquid to apply coating thereto.

However, in these treatments using a fluidized bed, there have been three problems.

A first problem is that in a conventional apparatus the efficiency of contact between air and powder is not necessarily high and that it is difficult to feed a spray liquid uniformly to powder so as to wet or coat the latter.

A second problem is that in fluidized bed granulation, since cohesion and coagulation of powder particles are performed using a liquid, the bulk specific density is lower than in other granulation processes such as agitated granulation.

A third problem is that problems occur in connection with GMP (Good Manufacturing Practices) associated with the remaining or falling of fine particles in the air inlet.

These problems will now be described in order.

There are two types of fluidized beds in general use; (1) a method comprising the steps of blowing air at a cavity speed of 1-5 m/sec through a metal gauze or punching plate installed substantially in the middle of the bottom of a cylindrical container to uniformly fluidize the powder and (2) a method comprising the steps of installing a guide tube substantially in the middle of a cylindrical container, blowing air at above the terminal speed of powder into the guide tube, coating or drying the powder in an ascending air current in said guide tube, separating the solid from the gas in the upper region of the guide tube, causing it to descend outside the guide tube of the cylindrical container, causing it to change its direction at the bottom of the container to ascend in the guide tube on the air current from below, thus forming a circulation flow. However, since the former method involves blowing-through of air, the efficiency of contact between air and powder is low and the movement of the powder is irregular so that processing is hardly applied uniformly to the entire powder. In the latter method, since a circulation flow is formed, uniform processing can be applied to the powder but, on the other hand, the space density of the powder in the guide tube is low, and air and powder flow in parallel, resulting in a disadvantage that the efficiency of contact and the efficiency of heat exchange between powder and air are low. Further, another drawback is that since the ratio of the part being processed to the whole is low, the volumetric efficiency of the apparatus is low.

Next, in fluidized bed granulation, in order to increase bulk specific density, it has been common practice to install an agitator vane wheel or a rotary plate at the bottom of a fluidized bed. Japanese Patent Publication No. 8735/1986 discloses a rotary plate adapted to rotate in a horizontal plane and installed at the bottom of a fluidized bed container, said rotary plate having crushing vanes formed thereon, while Japanese Patent Application Laid-Open Specification No. 164635/1986 discloses a rotary plate assembly in the form of a stack of annular plates having inclined vanes formed thereon; in each case, mechanical force is applied to aggregated particles to increase the bulk specific density with the intended object being attained in a way. In each case, the mechanism is complicated, presenting difficulties in washing and drying after operation, leaving problems associated with GMP to be described below.

Problems associated with GMP will now be discussed. In many of the conventional apparatuses used for processing powders, there have been employed a method in which the bottom of the container is made in the form of a wire gauze, a punching plate or slit plate to introduce air therethrough and a method as found in Japanese Patent Publication No. 7326-1986 in which a suction port is formed in the middle of the bottom of the container with a round canopy disposed thereabove which is larger than the suction port. In such systems, there is a drawback that not a little powder falls below the bottom of the container. Further, to decrease the amount of fall of powder, the meshes of the wire gauze are made smaller or the canopy is installed above the slit and as close to the bottom of the container as possible. However, if the meshes are made smaller, it takes time to completely remove the powder clogging in the meshes. Therefore, problems remain to be solved in the fields of medicines, foods and the like where great importance is placed on GMP, and a field where change of type is often made and cross contamination becomes a problem.

In the case where a canopy is installed above punching, slit or ventilation hole, in order to prevent the falling of powder, the canopy is installed as close to the bottom of the container as possible or, as disclosed in Japanese Patent Application Laid-Open Specification No. 236/1983 and Japanese utility Model Publication No. 11377/1983, in order to prevent powder from entering an air channel communicating with a shaft seal section, a shaft seal made of flexible material is installed between the shaft seal section for air introduced into the container and the delivery port in the container for said air. In such method, although the falling and entry of powder can be prevented, the canopy and shaft seal develop the function of damming up the air current moving out of the container, thus impeding smooth flow-out of air. When such apparatus is used for fluidized bed drying, fluidized bed granulation, agitated fluidized bed granulation or fluidized bed coating, it is difficult to introduce a necessary amount of air and the conditions for drying processed powder become nonuniform, leading to a deterioration in the quality of the product to be finally obtained due to improper flow of fluid. Further, another drawback of such method is that an amount of air necessary for flow cannot be introduced into the container without requiring a high pressure high horse power air supplying source.

In brief, in any of these conventional apparatuses, when it is desired to prevent powder being processed from falling out of the container, the flow air introducing section becomes complicated, making it difficult to clean the air introducing section or increasing the air passage resistance in the air introducing section, resulting in a difficulty in introducing a large amount of air into the container.

SUMMARY OF THE INVENTION

An object of the invention is to provide a powder processing apparatus which solves the above-described problems found in a conventional apparatus and which efficiently, uniformly and smoothly introduces flow air into the container without introducing problems associated with GMP, said apparatus having structural features for forming an ideal fluidized bed.

Another object is to provide an apparatus which is high in the efficiency of contact between air and powder, capable of uniformly processing powder to form particles of high bulk specific density with a uniform distribution of particle size in granulating operation and in coating operation to make it possible to effect coating such that particle surfaces are smooth with few massive particles, and which is free from problems associated with GMP and high in efficiency.

In one aspect of the invention, there is provided a powder processing apparatus wherein air is blown into a cylindrical container containing powder therein through its bottom to fluidize said powder for granulation or coating or for drying wet powder, said powder processing apparatus comprising a hollow cone frustum which is disposed on the bottom of the container and whose height gradually increases toward the center and whose upper and lower ends are open, a shaft installed within said cone frustum and formed with an air channel communicating with an air supply source outside the system, said shaft vertically extending through substantially the middle of said container and adapted to be driven for rotation, a hollow, frusto-conical body fixed on the upper end of said shaft and having an inclined wall opposed to the outer wall surface of the cone frustum, the upper portion of said frusto-conical body being closed, an air flow-out passage defined between the outer wall surface of the conical body and the inner wall surface of the frusto-conical body and extending from the upper portion of the interior to the outer periphery of the proximal end, and an air diffusion clearance defined between the skirt end of the frusto-conical body and the bottom of the container and adapted to blow air from the air flow-out passage into the container.

According to this powder processing apparatus, the powder tending to move outside the system from the container is dammed up by the cone frustum and at the same time it is moved back into the container by the air current moving at high speed in the clearance between the outer wall surface of the cone frustum and the inner wall surface of the frusto-conical body and the clearance between the skirt end of the frusto-conical body and the bottom plate of the container; thus, the falling of powder, which has been a problem, is prevented. Further, even if a slight amount of powder should enter under the frusto-conical body, it can be easily washed away by removing the frusto-conical body.

Further, the powder in the container flows as it is carried by air current uniformly blown into the container through the air diffusion clearance. This flow of powder is effectively performed by the air current emitted from an injection nozzle fixed to the cone frustum toward the bottom and wall of the container and by agitation brought about by agitator vanes provided on the cone frustum.

Thus, in performing a powder processing treatment utilizing a fluidized bed such as fluidized bed drying, fluidized bed granulation and fluidized coating, this apparatus provides flow air which efficiently, uniformly and smoothly flows into the container to form an ideal fluidized bed irrespectively of the fact that the mechanism is very simple, without offering problems associated with GMP which are critical in the fields of medicines and foods.

In another aspect of the invention, there is provided a powder processing apparatus for blowing air into a cylindrical container through its bottom to fluidize powder contained therein so as to perform such treatments as granulation and coating or to dry wet powder, said powder processing apparatus comprising a shaft vertically extending through substantially the middle of the container and driven for rotation, a hollow frusto-conical body fixed on the upper end of said shaft and closed at its upper end and having a downwardly diverging inclined wall, an air channel disposed below the frusto-conical body and communicating with an air supply source disposed outside the system to introduce air into the interior of the frusto-conical body, and a member positioned intermediate between the ends of the air channel or at the end associated with the frusto-conical body to prevent passage of powder, the arrangement being such that air introduced through said member is blown in the centrifugal direction into the container through a clearance between the skirt end of the inclined wall of the frusto-conical body and the bottom plate of the container.

According to this powder processing apparatus, cooperation between the rotation of the frusto-conical body and the air current emitted from the air diffusion clearance defined between the skirt end of the frusto-conical body and the bottom of the container provides an ideal rolling and flowing condition, making it possible to apply uniform processing to each of the particles forming the powder layer.

Further, the provision of cooperating members such as agitator vanes and fixed or rotary blades makes it possible to effect processing in the very location where the powder forms a fluidized bed under the action of air current, with the formation of the fluidized bed, coupled with particle regulating action, providing a higher efficiency of contact, thus realizing a powder processing treatment at higher efficiency.

Further, the supply of air into the container is effected through an air channel whose air outlet is covered by the frusto-conical body, and the provision of the member for preventing powder from passing through said air channel, coupled with the action of air current flowing out at high speed from the air diffusion clearance, preventing powder from entering the frusto-conical body and hence from flowing out of the system.

As described above, the construction which is very simple in spite of its capability of performing the sufficient functions described so far ensures easy and complete cleaning after processing.

The present invention, which provides an apparatus of simple construction for forming a rolling fluidized bed in the fields of medicines, foods, agricultural chemicals and the like where GMP has become increasingly important in recent years, contributes much to the development of the industry.

These and other objects and features of the invention will become more apparent from the following description to be given with reference to the accompanying drawings attached hereto by way of example only. In the drawings, similar parts or portions are denoted by the same reference numerals throughout the figures.

BRIEF DESCRIPTION OF THE DRAWINGS

FIGS. 6 through 9 are plan views showing modified forms of the agitator vanes shown in FIG. 5;

FIG. 10 is a plan view of the agitator vane shown in FIG. 5;

FIGS. 12 through 16 are longitudinal sectional views similar to FIG. 11, showing modifications of the embodiment shown in FIG. 11.

DESCRIPTION OF THE PREFERRED EMBODIMENTS

Figure 1:
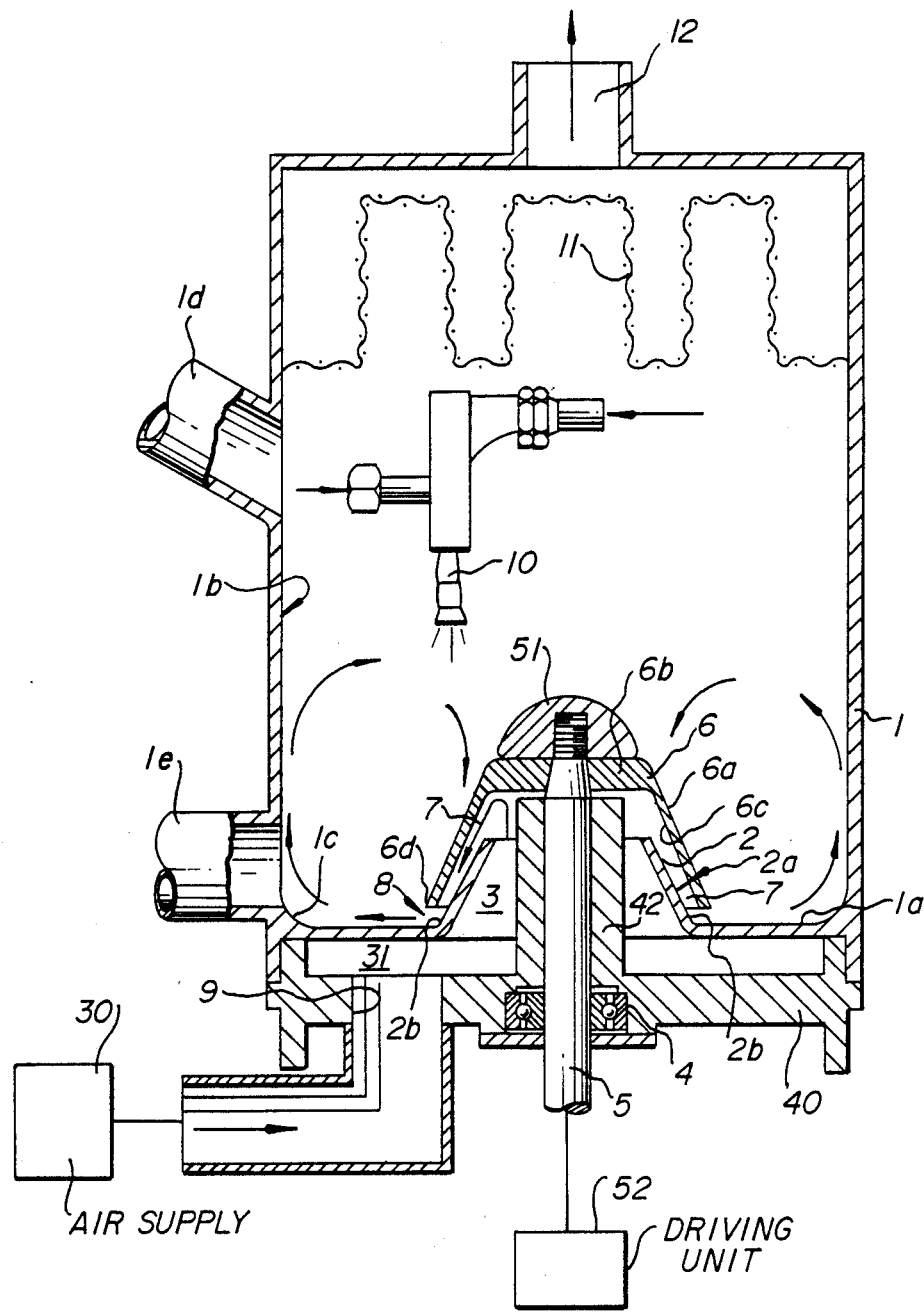
FIG. 1 is a schematic longitudinal sectional view of a powder processing apparatus embodying the present invention.
Figure 2:
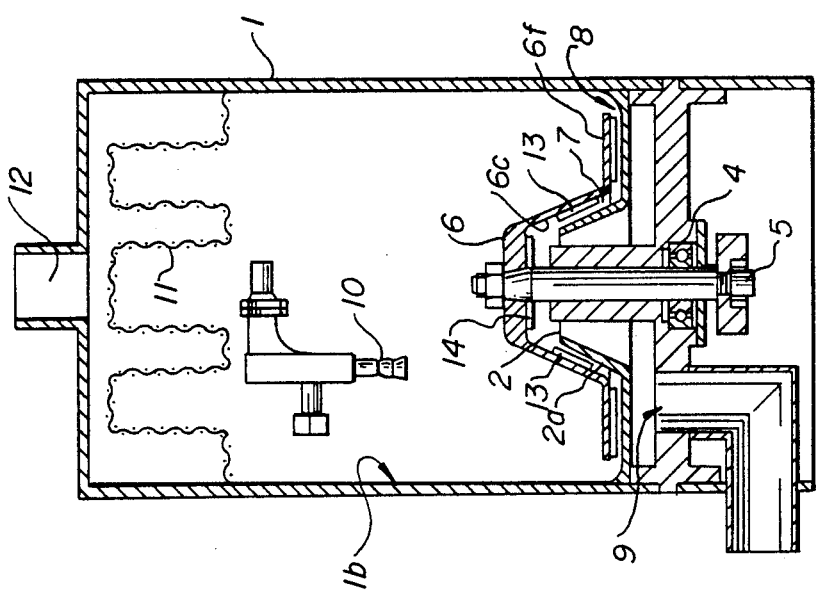

Referring to FIG. 1 showing a first embodiment of the invention, a powder processing apparatus has a cylindrical container 1 having a base plate 40 fixed to the bottom thereof. An air chamber 31 is defined between the bottom surface 1a of the container and the base plate 40. The bottom surface 1a has an opening 3 in the middle thereof. The portion of the bottom surface 1a forming the peripheral edge of the opening is raised to form a hollow cone frustum 2 whose height is gradually increased toward the center and whose upper and lower ends are open. A suction port connected to a suitable air supply source 30 such as blower installed outside the system opens to the air chamber 31. In the middle of the container 1, a shaft 5 supported for rotation in a bearing 4 in the base plate 40 is inserted in a pillar 42 erected on the middle of the base plate 40 and vertically extends through the opening 3. A hollow frusto-conical body 6 whose upper portion is covered with a top plate 6b and which has an inclined wall 6a opposed to the outer wall surface 2a of the cone frustum 2 is removably attached to the upper end of the shaft 5 by suitable fastening means, for example, a nut 51. The shaft 5 is connected at its lower end to driving means 52 adapted to rotate the shaft 5 through a suitable power transmission mechanism. The cone frustum 6 enhances the movement of powder ascending on air current emitted from an air diffusion clearance 8 in that when the powder falls, powder particles roll down the inclined wall 6a and then ascend on air current again from the skirt end 6d. Therefore, the angle of inclination of the inclined wall 6a is preferably 20 to 70 degrees, and it is desirable, if possible, to form a smooth concaved surface (see FIGS. 11, 12 14 and 16). That is, the inclined surface 6a of the frusto-conical body 6 may be either a straight conical surface (FIGS. 1 through 5, 13 and 15) or a concaved conical surface (FIGS. 11, 12, 14 and 16). In the latter case, it is preferable that the skirt end of the inclined surface 6a extend substantially horizontally. In the former case, a portion 6f radially extending in a horizontal plane from a substantially straight inclined wall 6a may be provided (FIG. 2). The outer wall surface 2a of the cone frustum 2 and the inner wall surface 6c of the inclined wall 6a of the frusto-conical body 6, both of which have a diameter gradually decreased toward the top, cooperate with each other to define a 1-5 mm wide labyrinth channel 7 for outlet of air extending obliquely from the opening 3, that is, air channel 3 formed in the cone frustum 2 to the outer periphery 2b of the proximal end of the cone frustum 2.

Defined between the outer periphery 2b of the proximal end of the cone frustum 2 and the inclined wall skirt end 6d of the frusto-conical body 6 is a 0.1-5 mm wide air diffusion clearance 8 for radially diffusing the air current in the container 1 which has flowed out of the labyrinth channel 7 throughout the circumference of the bottom surface 1a of the container 1. The size of the air diffusion clearance 8 is adjusted by vertically moving the frusto-conical body 6. To this end, for example, the frusto-conical body 6 is preferably capable of changing its axial attaching position with respect to the shaft 5. The difference in pressure between the air channel 3 and the container 1 is maintained between 5 and 500 mm water. This pressure difference is suitably selected according to the kind of powder to be processed and the processing conditions. Air is emitted at a flow-out speed of 5 to 50 m/sec from the air diffusion clearance 8 radially outwardly of the container 1 into the container 1. In order to cause the air current emitted from the air diffusion clearance 8 to ascend along the inner wall surface 1b of the container 1 to circulate the powder in a counter current fashion, the outer diameter of the inclined wall skirt end 6d of the frusto-conical body 6 is designed to be usually 30 to 70%, desirably 40 to 50% of the inner diameter of the container 1, but if rolling action is to be imparted to powder, it is designed to be 80 to 90%. For the same purpose, an annular curved surface 1c having a suitable radius of curvature according to the container 1 is formed at the intersection between the bottom surface 1a and the inner wall surface 1b of the container 1. The air flowing out of the air diffusion clearance 8 moves radially outward on the bottom surface 1a of the container 1, acting on the powder to be processed (not shown) fed into the container 1 to form a fluidized bed to perform the drying, granulation or coating function.

Disposed in the upper region of the interior of the container 1 are a spray nozzle 10 for feeding a granulating or coating liquid according to the usual method and a bag filter 11 disposed thereabove for separation between solid and gas. In addition, the spray nozzle 10 is shown positioned desirably above the flowing powder layer, but in some cases its position may be made changeable. An exhaust port 12 is disposed in the top of the container 1 while charging and discharging ports 1d and 1e for powder are disposed in the upper and lower sides, respectively. Alternatively, part of the container 1, for example, the top may be made removable for charging and discharging powder, in which case it is not always necessary to provide the charging and discharging ports 1d and 1e. Though not appearing in the drawings, it is desirable that the container can be easily disassembled, if necessary, for inspection, cleaning and other purposes. For example, the container 1 may be divided into three portions: a top portion including the bag filter, a bottom portion including the frusto-conical body 6 and its surroundings, and a barrel portion positioned between said two portions. And charging and discharging of powder and cleaning of the interior may be effected by laterally moving the barrel portion. In that case also, the charging and discharging ports 1d and 1e are unnecessary.

The powder particles charged into the container 1 and mounted on the upper surface of the frusto-conical body 6 roll down along the outer surface of the inclined wall 6a of the frusto-conical body 6 while whirling under the action of the centrifugal force produced by the rotation of the frusto-conical body 6 and the action of the air current circulating in a counter current fashion and are conveyed airborne toward the inner wall surface 1b of the container 1 by the air current emitted from the air diffusion clearance 8. The powder particles thus blown away are carried upward on the air current and then descend in the upper region of the container 1 toward the middle, reaching the top of the frusto-conical body 6, whereupon they roll down again along the outer surface of the frusto-conical body 6 while whirling; in this manner, they recycle. This recycle can be performed more efficiently by providing agitator vanes on the outer wall surface of the frusto-conical body 6, as will be later described. In this manner, the powder particles flow within the container 1, during which time a desired treatment such as drying, granulation or coating is performed.

A desired fluidized bed can also be formed by connecting the suction port of a blower to the exhaust port 12 to suck the air from the container 1, rather than by connecting the delivery port of a blower to the suction port 9 to feed air into the container 1 as in the above embodiment.

The flow rate of air fed into the container through the air channel 3, labyrinth 7 and air diffusion clearance 8 is suitably adjusted according to the processing conditions of powder in the container 1; it can be adjusted to the optimum value by adjusting the driving conditions of the blower and/or the degree of opening of the damper (not shown). The flow-out speed of air flowing out of the air diffusion clearance 8 into the container 1 can be adjusted by widening or narrowing the clearance 8 by adjusting the vertical position of the frusto-conical body 6, as described above.

FIG. 2 shows a modification having means for assisting air current flowing through the labyrinth channel 7. The matters in common with the apparatus shown in FIG. 1 are omitted from description. In this powder processing apparatus, radial or spiral blades 13 and 14 functioning as air current flow-out enhancing members are fixed on the inner wall surface 6c of the inclined wall 6a of the frusto-conical body 6. These blades 13 and 14 function as members for compressing and conveying air current as in the rotary blades of a known blower, applying push-out pressure to the air current flowing from the air channel 3 toward the labyrinth channel 7 and air diffusion clearance 8, thereby enhancing the counter-current circulation of air current fed from the air diffusion clearance 8 into the container 1. In the case of providing the horizontally extending portion 6f, described above, similar blades may also be provided on the lower surface of this portion 6f.

Figure 3:
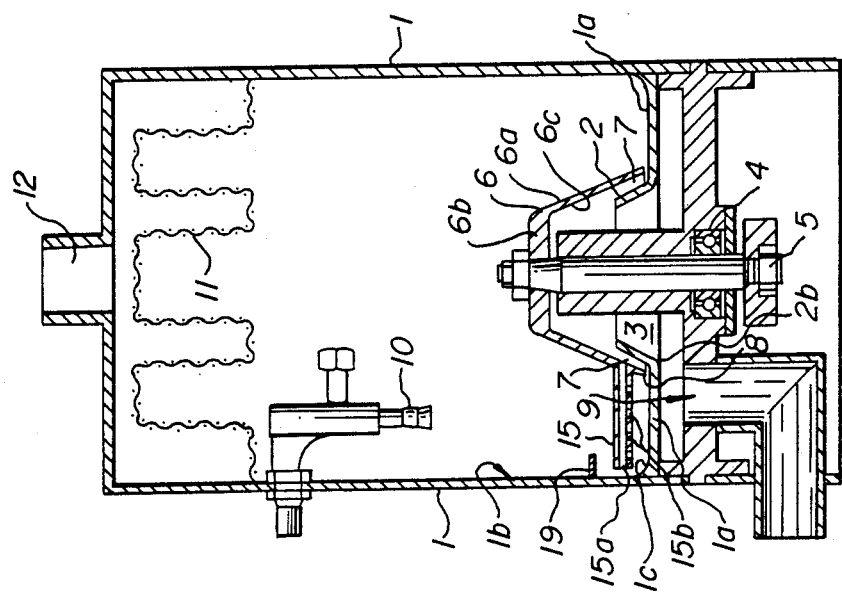
FIGS. 2 through 5 are schematic longitudinal sectional views similar to FIG. 1, showing modifications of the embodiment of FIG. 1.

FIG. 3 shows a modification wherein one or two or more air blow nozzles 15 communicating with the labyrinth channel 7 are provided, integral with the frusto-conical body 6. Each air blow nozzle 15 is formed with two types of air blow holes. A first hole 15a opens in the front end surface of the air blow nozzle 15 and is opposed to the inner wall surface 1b of the container 1, so that the air current emitted from said air blow hole 15a prevents powder particles from adhering to the annular curved surface 1c and inner wall surface 1b of the container 1. One or two or more second air blow holes 15b are opposed to the bottom plate 1a of the cylindrical container 1, and the air currents emitted from said air blow holes 15b perform the functions of blowing up powder particles which tend to settle on the bottom surface 1a and preventing powder particles from clogging between the air blow nozzles 15 and the bottom plate 1a. Further, the air blown from the air blow nozzles 15 into the container 1, coupled with the air current blown in from the air blow nozzles 15, serves to form an ideal fluidized bed. The proportions of the amount of air blown from the air diffusion clearance 8 into the container 1 and the amount of air blown from the air blow nozzles 15 into the container 1 can be adjusted by raising or lowering the frusto-conical body 6, as described above.

Figure 4:
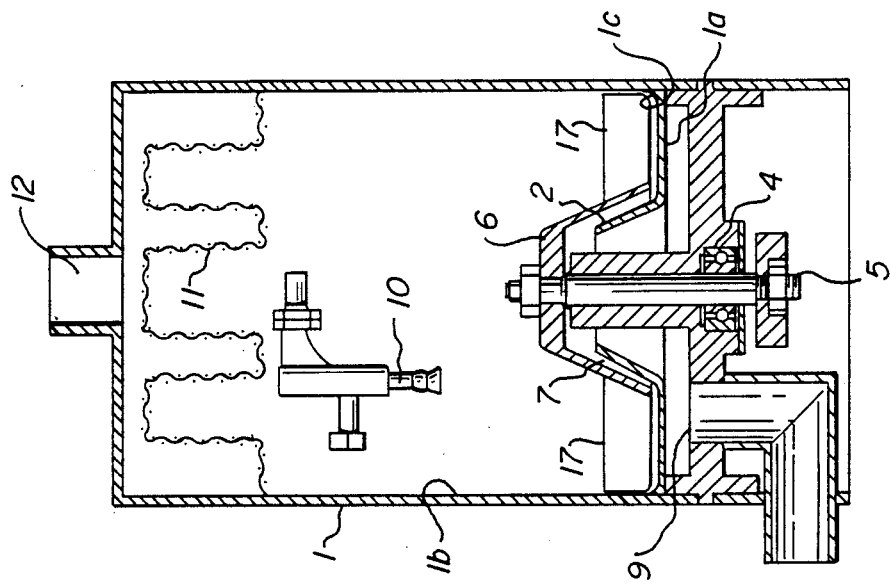

The supply of air to the air blow nozzles 15 may be effected from an air channel 16 formed in the shaft 5, as shown in FIG. 4, and communicating with an air supply source outside the system, rather than through the labyrinth channel as shown in FIG. 3.

Figure 5:
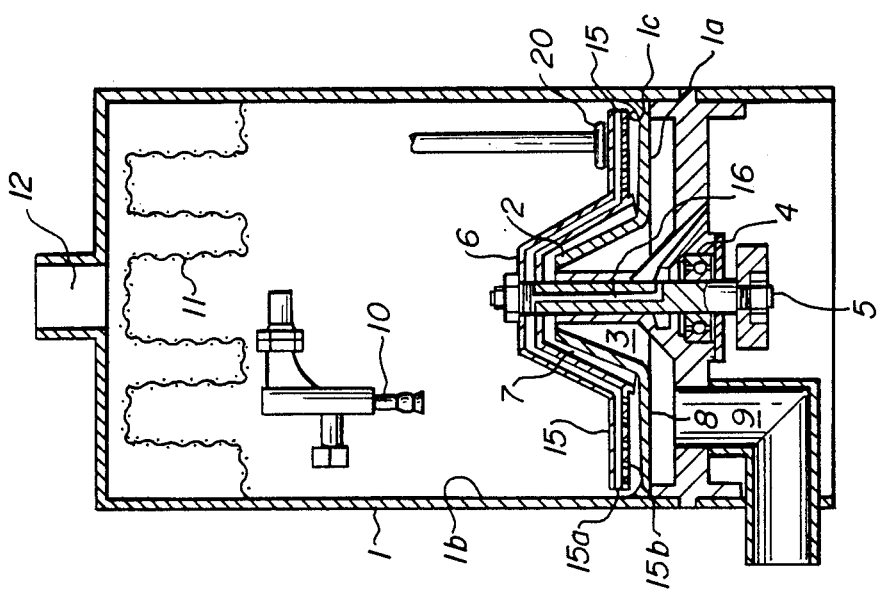

FIG. 5 shows a modification having agitator vanes 17 for effecting the flow of powder more ideally. In the following description, the matters in common with the embodiment shown in FIG. 1 are omitted from the following description. In a powder processing apparatus shown in FIG. 5, two or more agitator vanes 17 radially extending at a predetermined phase angle along the circumference are fixed on the lower portion of the inclined wall 6a of the frusto-conical body 6 as they are slightly spaced from the bottom surface 1a of the container 1, with the front ends of the agitator vanes 17 being positioned close to the inner wall surface 1b of the container 1. As shown in FIG. 6, the height of the front portion 17a of the agitator vane is decreased in the direction of rotation and the rear portion 17b of the agitator vane has a substantially horizontal flat surface. The air blow nozzle 15 in the modification shown in FIG. 4 may be installed below the agitator vane 17, as shown in FIG. 7. As shown in FIG. 8, the agitator vane 17 may be made integral with the air blow nozzle 15.

The agitator vane 17, as shown in FIGS. 9 and 10, may be provided with a particle regulating member 18 extending rearward as viewed in the direction of rotation and substantially horizontally along the inner wall surface 1b of the container. A fixed blade 13 (FIG. 3) or rotary blade 20 (FIG. 4) may be provided which cooperates with the rear portion 17b of the agitator vane to perform the particle regulating function. In the case of a multi-function powder processing apparatus capable of performing various powder processing treatments, it is advantageous to arrange the fixed blade 19 and the rotary blade 20 so that they can be removed when the processing treatment does not require them.

The agitator vane 17, as shown in FIGS. 6-9, comprises an inclined surface 17a functioning as a revolving current producing section and having an angle of inclination of 25 to 50 degrees sloping downward to extend in the direction of rotation, and a horizontal or substantially horizontal gently curved surface 17b functioning as a particle regulating section connected to the upper end of the inclined surface. The fixed blade 19 or rotary blade 20 disposed immediately above the agitator vane 17 and close to the inner peripheral wall surface of the container 1 has a radial length of not more than ⅓ of the radius of the container 1, as measured from the inner wall surface 1b of the container toward the center, and also has a sharp edge and is located 1 mm to 5 mm, preferably 1.5 mm to 2.5 mm above the horizontal surface 17b of the agitator vane, the blade surface being substantially horizontal or somewhat inclined. A single or a plurality of such fixed blades 19 will be provided according to the capacity of the container 1. On the other hand, the rotary blade 20 is attached to a rotary shaft 21 depending from the top of the container or an unillustrated rotary shaft supported coaxial with the rotary shaft 5 of the agitator vanes 17 and is driven for rotation in a direction opposite to the direction of rotation of the agitator vanes 17. The rotary blade 20, like the fixed blade 19, is installed so that its blade surface is substantially parallel with the horizontal surface 1b of the agitator vane 17.

Flow regulating operation based on the cooperation between the agitator vanes 17 and the fixed blade 19 or rotary blade 20 will now be described.

As the agitator vanes are rotated at high speed, the particle layer starts to revolve by the action of the inclined surface 17a serving as a revolving current producing section imparting a rolling and compacting action to particles, thereby enhancing spheroidization. Particles are moved along the inclined surface 17a to reach the particle regulating section, i. e. the horizontal surface 17b of the agitator vane 17, whereupon particles of larger size hit the sharp edge of the fixed blade 19 and is thereby crushed, while particles of smaller size avoid hitting the fixed blade 19 and instead move by while revolving. Further, coarse particles which cannot pass through the clearance between the horizontal surface 17b of the agitator vane 17 and the fixed blade 19 are crushed. In this manner, spheroidization by the rolling and compacting action produced by the revolving current is performed at the same time as the particle regulation based on the crushing or grinding of coarse particles. The particle regulating effect is developed by the combined action of the fixed blade 19 and the horizontal surface 17b which is the particle regulating section of the agitator vane 17; in this case, the vertical distance between the horizontal surface 17b of the agitator vane 17 and the fixed blade 19 is important. More particularly, if this distance is relatively long, the effect of crushing or grinding coarse particles is low, resulting in an increase in the average diameter of particles obtained, while if it is relatively short, particles of relatively small diameter are also crushed by the fixed blade 19 during rolling on the horizontal surface 17b of the agitator vane 17, reducing the average diameter of particles. Thus, by adjusting the vertical distance between the horizontal surface 17b of the agitator vane 17, granules having different average diameters can be obtained.

However, it must be taken into account that if the fixed blade 19 is positioned sloping upward or the length of the fixed blade 19 extending radially of the container 1 is too long, this impedes the formation of a revolving current, causing the fluidized bed to stagnate. To avoid this, the length of the fixed blade 19 extending radially of the container 1 must not be greater than necessary.

The granulating function has so far been described with reference to a combination of the fixed blade 19 and the agitator vanes 17, but the same effect can also be obtained even if the fixed blade is replaced by the rotary blade 20 having a relative rotative direction opposite to the rotative direction of the agitator vanes 17. That is, by setting their respective rotative speeds so that the relative rotative direction of the rotary blade 20 is opposite to that of the agitator blades 17, the relative speed between particles and the rotary blade 20 becomes greater than when the fixed blade 19 is used, increasing the crushing or grinding effect. Though serving to reduce coarse particles, this tends to make particles indefinite in shape. Therefore, it is necessary that the relative rotative speed between the agitator vanes 17 and the rotary blade 20 be suitably adjusted according to the diameter of particles to be processed.

Figure 11:
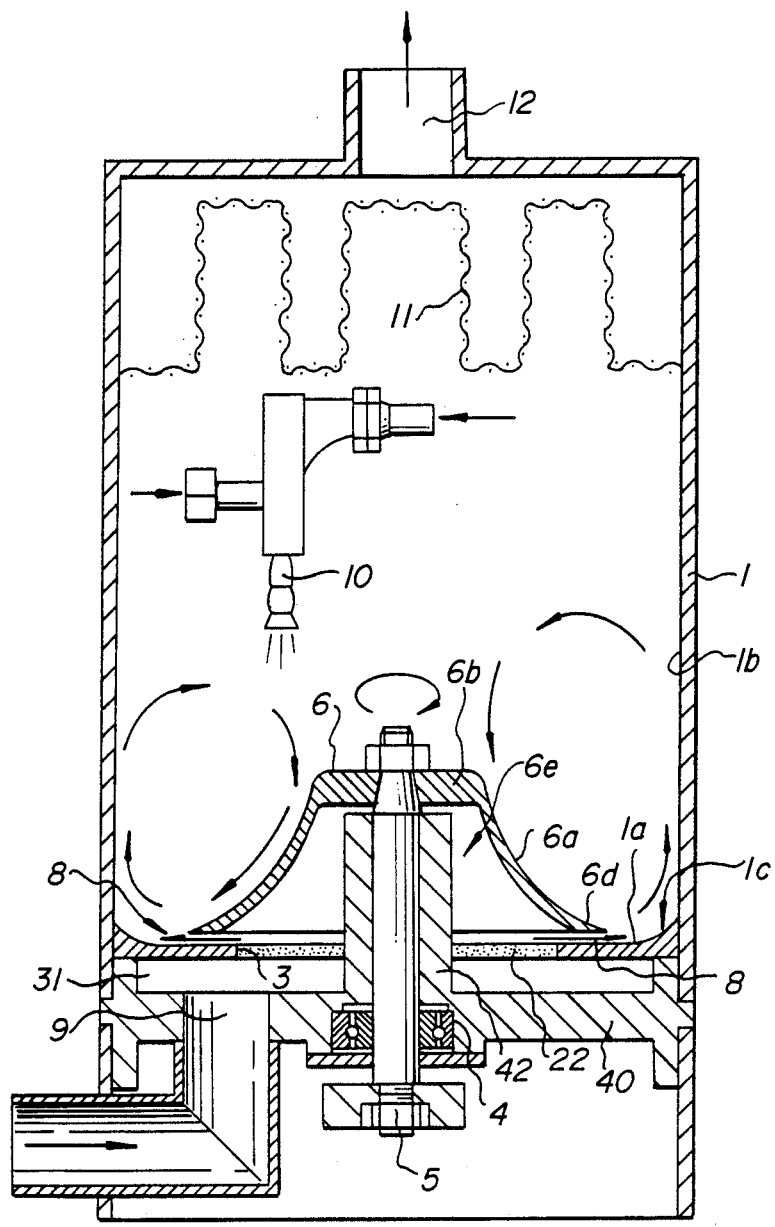
FIG. 11 is a longitudinal sectional view of a powder processing apparatus according to another embodiment of the invention.

Reference will now be made to FIG. 11 showing a second embodiment of the invention. A member 22 for preventing passage of powders is integrally or removably installed in an opening positioned at substantially the middle of the bottom surface 1a of the cylindrical container 1. The member 22 acts to prevent passage of powder while allowing air to pass therethrough and it is possible to employ a metal gauze, porous plate, sintered metal plate and other suitable air-permeable materials. The hollow frusto-conical body 6 fixed on the upper end of the shaft 5 is in the form of a funnel-shaped inclined wall 6a whose top is closed by a top plate 6b, the skirt end of the inclined wall 6a being horizontal. In addition, as described above in connection with FIG. 1, the inclined wall 6a preferably has a curved surface whose slope gradually decreases radially outward, as shown. The upper surface of the bottom 1a of the container 17 is substantially completely covered by the frusto-conical body 6 and the interior 6e of the frusto-conical body 6 communicates with a suction port 9 connected to an air supply source outside the system (FIG. 1) through the member 22 and an air chamber 31. The air introduced into the frusto-conical body 6 through the member 22 is blown into the container 1 in the centrifugal direction at a flow rate of 5-30 m/sec through the air diffusion clearance 8 defined between the skirt end 6d of the frusto-conical body 6 and the bottom plate 1a of the container 1.

The powder particles charged into the container 1 slide down while rolling in the centrifugal direction on the inclined wall 6a with the rotation of the frusto-conical body 6, until they reach the skirt end 6d of the frusto-conical body 6, whereupon they ride on the air current blown from the air diffusion clearance 8 and they are diffused by said air, floating in a whirl. And the powder particles that have been suitably lifted then fall down through the middle of the container 1 and, again, slide down the inclined wall 6a while rolling in the centrifugal direction with the rotation of the frusto-conical body 6; this circulating flow is repeated. At a suitable location in this circulating flow, a liquid is added as by a spray nozzle to perform granulation or coating.

In this manner, powder forms a circulating flow so that individual particles are uniformly wetted with the liquid, subjected to a rolling action by the frusto-conical body 6, and dried in distributed condition; because of this regular recycle, uniform processing without unevenness can be performed. Further, air passes concentrically in the peripheral region of the container 1 with great centrifugally flowing powder layer height, the efficiency of contact between powder and air is high. Since powder is subjected to a rolling action by the frusto-conical body 6, it is subjected to a suitable compacting action so that the bulk specific density is increased. Further, because of the air current blowing out at a flow rate of 5–30 m/sec from the air diffusion clearance 8, almost no entry of powder being processed into the space below the frusto-conical body 6 is observed.

FIG. 12 shows a modification wherein the member 22a for preventing passage of powder is in the form of a cone frustum. In this case, even if powder should enter the space below the frusto-conical body 6, the inclined wall 22b of the member 22a rising from the bottom surface 1a prevents the powder from moving to the middle of the bottom of the container 1. Moreover, an outwardly directed fast air current between the inclined wall 6a of the frusto-conical body 6 and the inclined wall 22b of the member 22a prevents powder from entering the shaft seal section 5a of the shaft 5. That is, problems associated with GMP are precluded.

Figure 13:
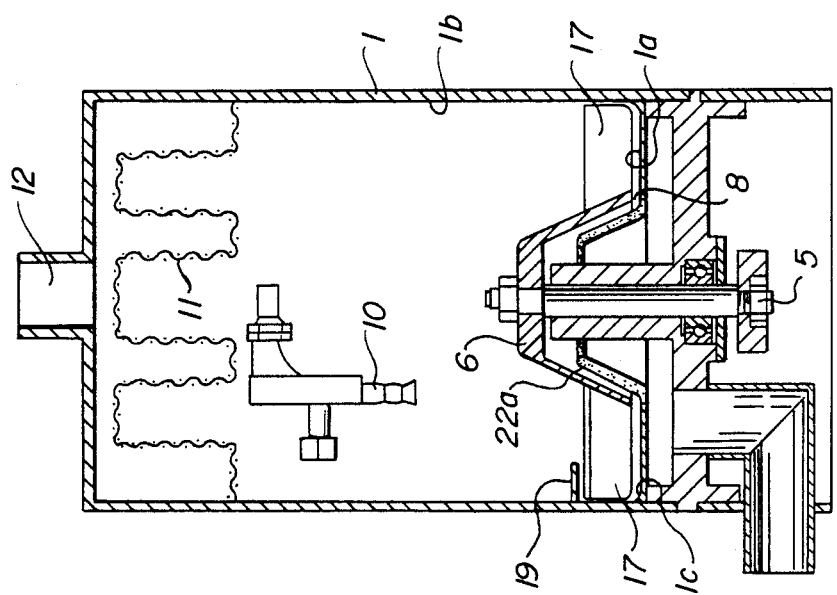

FIG. 13 shows a modification wherein agitation vanes 17 are attached to a frusto-conical body 6 as previously described with reference to FIGS. 5 through 10. In the examples shown in FIGS. 11 and 12, it has been shown that ideal powder processing can be performed by the formation of a fluidized bed by passage of air through the peripheral region of the interior of the container 1, the formation of a circulating current due to rotation of the frusto-conical body, and the addition of a rolling action. In a granulating operation intended to provide particles of high bulk specific gravity by increasing the amount of liquid to be added, crushing and rolling can be efficiently performed by the agitator vanes 17. When it is desired to obtain particles which are uniform in size, this can be attained by providing the blades 19 and 20.

Figure 14:
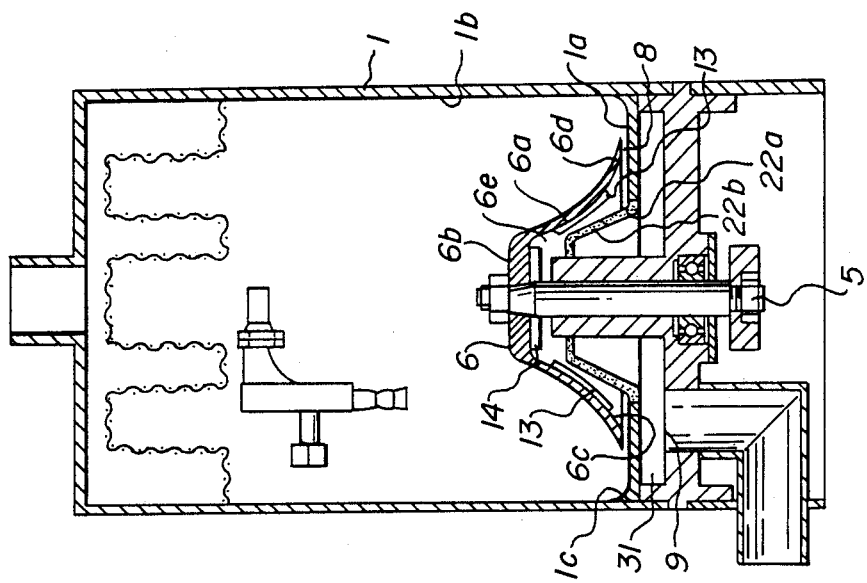

FIG. 14 shows a modification provided with means for assisting an air current flowing between the inclined wall 22b of the member 22a for preventing passage of powder and the inclined wall 6a of the frusto-conical body 6, as previously described with reference to FIG. 2. The inner surface 6c of the inclined wall 6a of the frusto-conical body 6 has fixed thereto radial or spiral blades 13 and 14 functioning as air current flow-out enhancing members. These blades 13 and 14 function as members for compressing and conveying air current as in the rotary blades of a known blower, applying push-out pressure to the air current flowing from the suction port 9 via the air chamber 31 and member 22a into the air diffusion clearance 8, thereby enhancing the counter-current circulation of air current fed from the air diffusion clearance 8 into the container 1.

Figure 15:
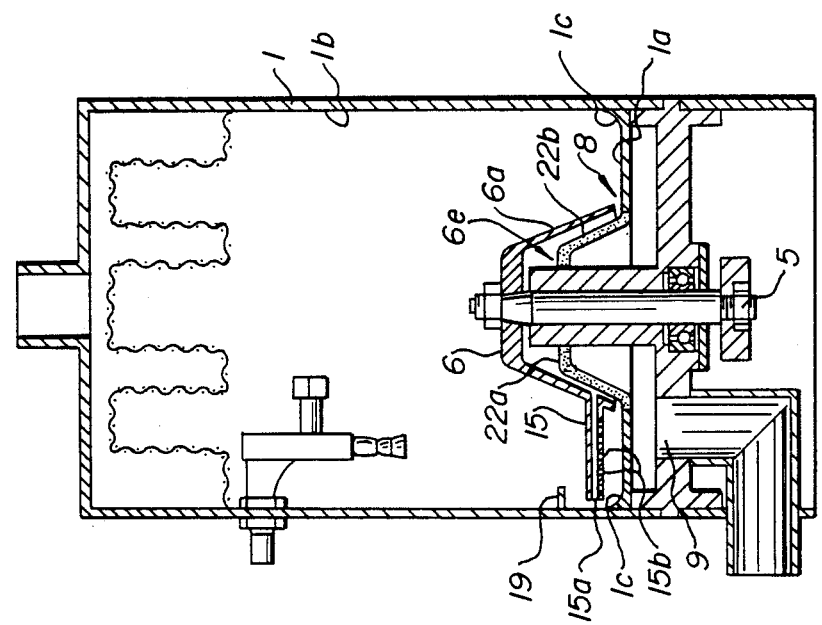

FIG. 15 shows a modification wherein, in the same manner as previously described with reference to FIG. 3, the inclined wall 6a of the frusto-conical body 6 has one or two or more air blow nozzles 15 which open to the interior 6e of the frusto-conical member 6, said nozzles being made integral with the frusto-conical body 6. Each air blow nozzle 15 has two types of air blow holes 15a and 15b formed therein. A first air blow nozzle 15a opens in the front end surface of the air blow nozzle 15 and is opposed to the inner wall 1b of the container 1, so that the air current blown from this air blow hole 15a prevents powder from adhering to the annular curved surface 1c and inner wall surface 1b of the container 1. One or two or more second air blow holes 15b are opposed to the bottom surface 1a of the container 1, and the air currents emitted from these blow holes 15b perform the function of flying up powder which tends to stagnate on the bottom surface 1a and the function of preventing powder from clogging between the air blow nozzle 15 and the bottom surface 1a. Further, the air blown from the air blow holes 15a and 15b cooperates with the air blown into the container 1 from the air diffusion clearance 8 to form an ideal fluidized bed. The proportions of the amount of air blown into the container 1 from the air diffusion clearance 8 and the amount of air blown into the container 1 from the air blow nozzles 15 can be adjusted by changing the vertical position of the frusto-conical body 6, as already described.

Figure 16:
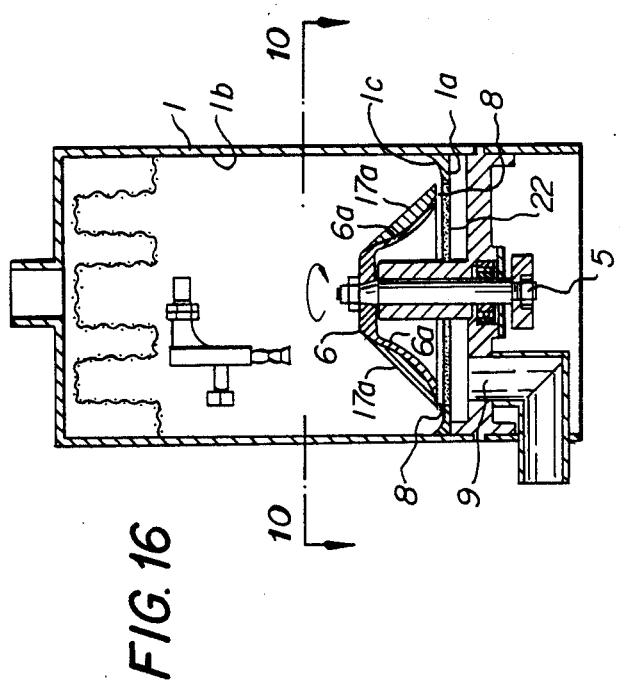
Figure 17:
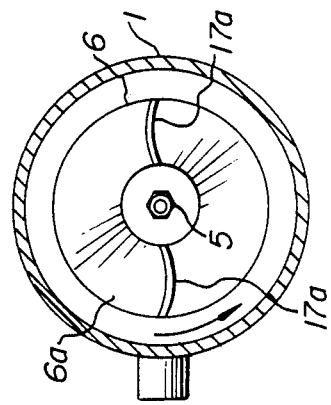
FIG. 17 is a sectional view taken along the line X—X in FIG. 16.

In the modification shown in FIGS. 16 and 17, the agitator vanes 17 used in the modification shown in FIG. 13 or 5 are replaced by baffles 17a serving as circulation enhancing members provided on the upper surface of the inclined wall 6a of the frusto-conical body 6. This modification is useful when the crushing action in the modification shown in FIG. 13 is unnecessary or produces adverse results.

The outer diameters of the members 22 and 22a have been made smaller than the diameter of the skirt end 6d of the frusto-conical body 6, as illustrated; besides this, they may be made substantially the same as or greater than said diameter. Further, instead of separately forming the bottom plate 1a and the members 22 and 22a, the entire bottom plate 1 may be made of air-permeable material. That is, the members 22 and 22a may extend over the entire bottom surface. In that case also, since the region extending outside the frusto-conical body is relatively narrow, there is no danger of adversely affecting the air current blown from the air diffusion clearance 8 and the falling of powder is, of course, prevented. Additionally, the air blown through this member serves to prevent the powder from stagnating on the bottom surface.

What is claimed is:

1. A powder processing apparatus for fluidizing powder fed thereto and for treating said powder fluidized there in comprising:
 a cylindrical container having means for feeding powder particles thereinto, an exhause port in the top and an opening substantially in the middle of the bottom surface and formed at the bottom surface with an air chamber communicating, at one of its ends, with said opening and, at its other end, with a suction port,
 a rotatable shaft vertically extending through said opening,
 a frusto-conical hollow impervious body closed at its upper end and fixed on the upper end of said shaft, said hollow body having a frusto-conical skirt, open at its lower end and spaced from said bottom surface of said cylindrical container and forming an air diffusion clearance with said bottom surface, and
 a driving unit for rotating said shaft and said hollow body,
 said frusto-conical body fixed on said shaft, when rotated by said driving unit, said opening being within the periphery of said body feeding air from said suction port through said air chamber, into said container and through said air diffusion clearance into said container in a centrifugal direction for fluidizing powder fed to said chamber for processing in said container.

2. An apparatus as set forth in claim 1, wherein said frusto-conical body has fixed thereto a radial or spiral blade for enhancing the flow-out of air.

3. An apparatus as set forth in claim 1, wherein the peripheral edge of said bottom surface is smoothly connected to the inner wall surface of said container.

4. An apparatus as set forth in claim 1, wherein the portion of said bottom surface around said opening is raised, forming a frusto-conical opening.

5. An apparatus as set forth in claim 4, in which said raised portion forms a hollow cone frustum, open at its upper and lower ends, and an air flow-out passage is formed between an inclined wall of said cone frustum and an inclined wall of said frusto-conical body.

6. An apparatus as set forth in claim 1, wherein an inclined wall of said frusto-conical body has a smooth conical surface.

7. An apparatus as set forth in claim 6, wherein said frusto-conical body extends radially outward in a horizontal plane from the skirt end of the inclined surface.

8. An apparatus as set forth in claim 1, wherein an inclined wall of said frusto-conical body has a gentle concave curved surface.

9. An apparatus as set forth in claim 8, wherein the skirt end of said inclined wall extends substantially horizontally.

10. An apparatus as set forth in claim 1, wherein an inclined surface of said frusto-conical body has an agitator vane fixed to the outer periphery thereof.

11. An apparatus as set forth in claim 10, wherein said agitator vane has an inclined surface sloping down in the direction of rotation of the frusto-conical body, and a horizontal surface extending substantially horizontally from the upper end of the inclined surface and rearwardly in the direction of rotation.

12. An apparatus as set forth in claim 11, wherein said horizontal surface includes an extension which extends horizontally along the inner wall surface of the container.

13. An apparatus as set forth in claim 11, wherein the vertical distance between the horizontal surface of said agitator vane and said blade is not less than 1 mm but not more than 20 mm.

14. An apparatus as set forth in claim 1, wherein a member made of air-permeable material which prevents passage of powder is installed in the opening in said bottom surface.

15. An apparatus as set forth in claim 14, wherein said member is in the form of a cone frustum and an air flow-out passage is defined between the inclined wall of said cone frustum and the inclined wall of said frusto-conical body.

16. An apparatus as set forth in claim 14, wherein the outer diameter of said member is smaller than the diameter of the skirt end of said frusto-conical body.

17. An apparatus as set forth in claim 14, wherein the outer diameter of said member is substantially equal to the diameter of the skirt end of said frusto-conical body.

18. An apparatus as set forth in claim 14, wherein the outer diameter of said member is greater than the diameter of the skirt end of said frusto-conical body.

19. An apparatus as set forth in claim 14, wherein said opening is made of air-permeable material.

* * * * *